United States Patent [19]
Kobayashi

[11] Patent Number: 5,947,683
[45] Date of Patent: Sep. 7, 1999

[54] AXIAL COMPRESSSOR STATIONARY BLADE

[75] Inventor: Kazuya Kobayashi, Takasago, Japan

[73] Assignee: Mitsubishi Heavy Industries, Ltd., Tokyo, Japan

[21] Appl. No.: 08/848,465

[22] Filed: May 8, 1997

[51] Int. Cl.[6] ...................................................... F01D 9/00
[52] U.S. Cl. ........................ 415/208.1; 415/191; 415/914; 416/223
[58] Field of Search ................................ 415/208.1, 208.2, 415/914, 192, 191; 416/189, 223 A, DIG. 5

[56] References Cited

U.S. PATENT DOCUMENTS

| | | | |
|---|---|---|---|
| 5,088,892 | 2/1992 | Weingold et al. | 415/914 |
| 5,292,230 | 3/1994 | Brown | 416/223 A |

FOREIGN PATENT DOCUMENTS

| | | |
|---|---|---|
| 4-132499 | 12/1992 | Japan . |
| 5-44691 | 2/1993 | Japan . |

*Primary Examiner*—F. Daniel Lopez
*Assistant Examiner*—Richard Woo
*Attorney, Agent, or Firm*—Wenderoth, Lind & Ponack, L.L.P.

[57] ABSTRACT

For obtaining a highly compressed air in an axial compressor, a load per blade row must be reduced and blade rows must be increased in number by so much that the apparatus becomes unavoidably larger. The present invention provides an axial compressor stationary blade wherein a blade portion near an end wall face is twisted so as to coincide with a direction of a boundary layer flow occurring in the vicinity of the blade portion. This blade portion and a blade portion for the main flow are turned differently from each other over a distortion or twist angle, and thereby growth of the boundary layer flow is suppressed, an increase of losses is prevented, and the apparatus can be made compact.

9 Claims, 3 Drawing Sheets

AXIAL COMPRESSSOR STATIONARY BLADE

BACKGROUND OF THE INVENTION

1. Field of the Invention

The present invention relates to an axial compressor as a main component of an industrial use gas turbine, a jet engine, etc.

2. Description of the Prior Art

In an industrial use gas turbine or a jet engine, a gas turbine is rotated for obtaining an output by a fuel combustion at a combustor using a compressed air.

At this time, at an axial compressor operating for compressing air, in order to alleviate a load acting per blade row, blade rows are increased in number and thus a predetermined output and efficiency is obtained. For this reason, while a certain efficiency is secured, the apparatus becomes larger unavoidably.

That is, as shown by one example of a stationary blade profile in the prior art of FIG. 5, since a stationary blade 1 which is fixed to an end wall face 3 is provided straight-uprightly so that a projection of any blade cross section is overlapped at one position, when the air flowing from an inlet of the compressor as shown by an arrow A makes contact with the end wall face 3 formed by a shroud etc. and the other end wall face (not shown) formed by a casing etc. (not shown), there is structurally occurring and growing a boundary layer flow 4 at a respective vicinity of said end wall faces.

Such occurring and growing of the boundary layer flow as mentioned above bring about a loss at the vicinity of the blade end wall faces and a lowering of efficiency and yet that becomes larger as the load per blade row increases, thus there is such a shortcoming that, in order to obtain a compressed air of a predetermined pressure efficiently by an industrial use gas turbine etc., the load per blade row must be reduced and the blade rows must be increased in number by so much, thus the entire apparatus becomes larger unavoidably.

SUMMARY OF THE INVENTION

It is, therefore, an object of the present invention to provide an apparatus which is able to attain a high efficiency, dissolving the problem in the prior art, and which is compact in size.

In order to attain said object, the present invention discloses an axial compressor stationary blade wherein a blade portion near an end wall face is distorted so as to coincide with a direction of a boundary layer flow occurring at a vicinity of said blade portion near the end wall face, and said blade portion near the end wall face and a blade portion of a main flow are distorted differently from each other in a distortion angle.

That is, in the present invention, the blade portion near the end wall face is distorted so as to coincide substantially with the direction of the boundary layer flow occurring there, so that said blade portion is directed in the direction of the boundary layer flow, thus the growth of the boundary layer flow is suppressed.

DESCRIPTION OF THE PREFERRED EMBODIMENTS

Description is made on one preferred embodiment according to the present invention with reference to FIGS. 1 to 4. It is to be noted that, in the respective figure, same numerals denote same parts and parts corresponding to those in the prior art shown in FIG. 5 are denoted by same numerals.

Numeral 1 denotes a stationary blade of an axial compressor and numeral 2 denotes a blade profile thereof and, in the figure, the stationary blade 1 is shown so that both an upper end portion and a lower end portion thereof are seen clearly.

Numeral 3 denotes an end wall face formed by a portion of a shroud and one end of the stationary blade 1 is fixed to said end wall face 3. Incidentally, though omitted in the figure, the other end of the stationary blade 1 is fixed to a casing, a portion of which forms the other end wall face, but only a description of the end wall face 3 of said one end (the shroud side) is made here.

Numeral 4 denotes a boundary layer flow occurring at a blade portion near the end wall face 3. Incidentally, a boundary layer flow occurring on the other end side is shown in the figure so as to correspond to the boundary layer flow 4 of said one end side.

To be noted here is that, in this preferred embodiment, the stationary blade 1 is distorted so that a blade portion near the end wall face 3 of said one end and a blade portion near an end wall face (not shown) of the other end are distorted so as to coincide with a direction of said boundary layer flow 4, which results in that, if seen on a plurality of cross sections taken in a longitudinal direction of the stationary blade 1, the blade portion near the end wall face is distorted differently from a central portion facing to a main flow in a distortion angle, that is, distorted larger.

Figure 1:
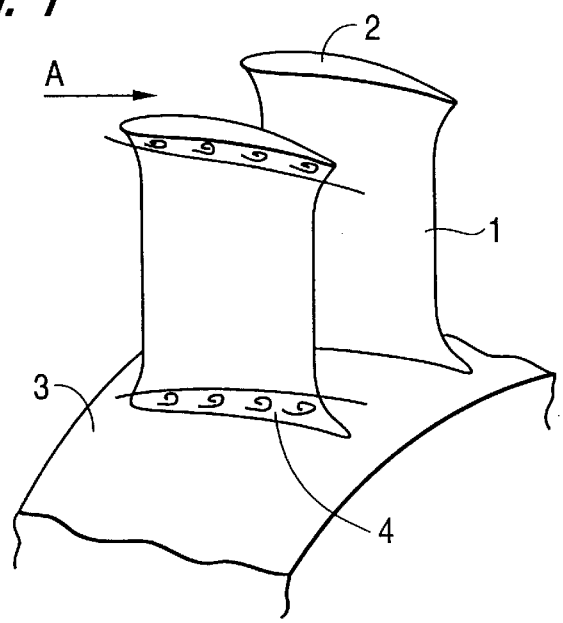
FIG. 1 is a schematic view of a stationary blade of a preferred embodiment according to the present invention.
Figure 2A:
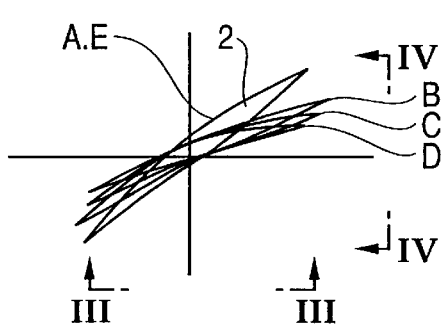
FIG. 2(a) is a stacking view showing a state of distortion of the stationary blade of FIG. 1.
Figure 2B:
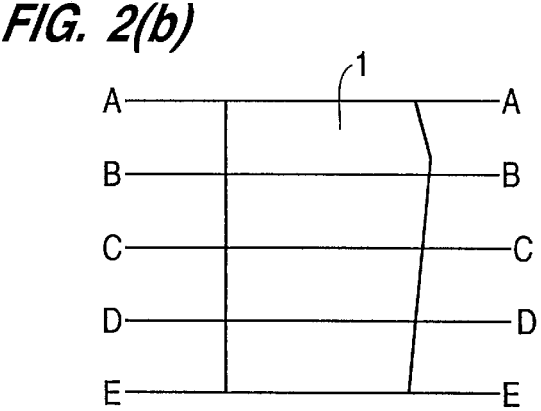
FIG. 2(b) is an explanatory view showing a position each of cross sections A to E of FIG. 2(a).
Figure 3:
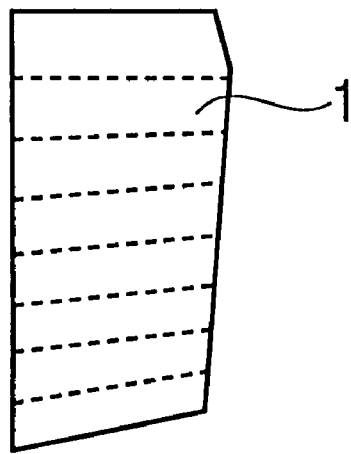
FIG. 3 is a view seen from line III—III in arrow direction of FIG. 2(a).
Figure 4:
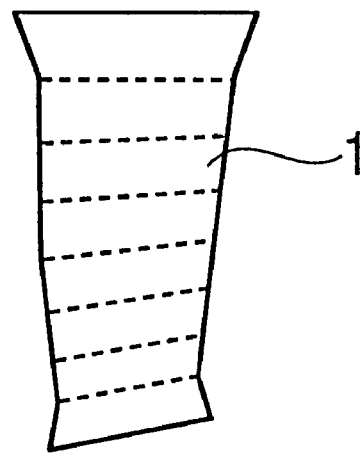
FIG. 4 is a view seen from line IV—IV in arrow direction of FIG. 2(a).
Figure 5:
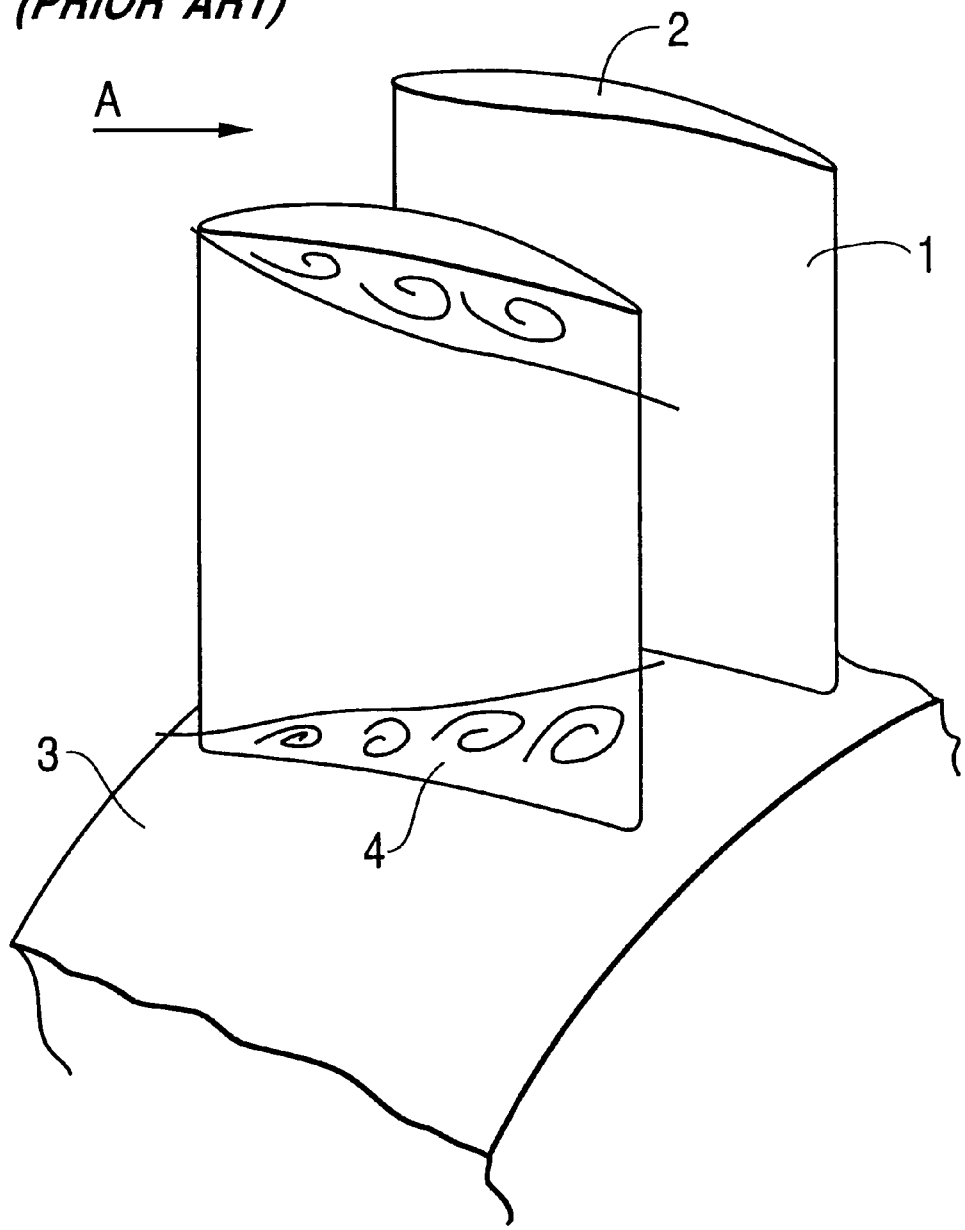
FIG. 5 is a schematic view of a stationary blade in the prior art.

Said state will be understood easily from FIGS. 2 to 4 which show stacking views of the blade.

That is, FIG. 2(a) shows a state that a plurality of cross sections taken in the longitudinal direction of the stationary blade 1 are seen stacked and, in this figure, a blade profile shown by the numeral 2 is the blade profile of each end of the blade at the positions A, E of FIG. 2(b) and a portion where a plurality of blade profiles are shown congestedly shows the blade profiles of other positions, that is, B, C and D, of FIG. 2(b).

This means that, in said preferred embodiment, the blade portions near the end wall faces, or near the boundary layer flows in other words, are largely distorted as compared with the blade central portion.

In the axial compressor, if a pressure ratio per blade row increases (that is, a load increases), a secondary flow near the end wall face becomes larger. This secondary flow is nothing but a loss component and if it becomes larger, efficiency of the compressor becomes worse extremely.

The stationary blade in the prior art as mentioned above, having a blade profile which is straight in the height direction (longitudinal direction) of the blade, does not match the boundary layer flow having different flow angles from the main flow portion, so that the flow peels from the blade face and the loss component becomes larger. But in the present preferred embodiment, the blade profile 2 is distorted at the blade portion near the end wall face 3 so as to coincide with the direction of the boundary layer flow 4 and the boundary layer flow 4 flows well along the blade profile, thereby development and growth of the secondary flow is suppressed and increase of loss can be prevented.

It is to be noted that the extent of the coincidence of the direction of the boundary layer flow 4 and the distortion of the portion of the stationary blade 1 near the end wall face is not necessarily required to be of a geometrical preciseness but it may be such that the development and growth of the secondary flow is suppressed as mentioned above.

According to the present invention, the portion of the stationary blade near the end wall face is distorted to the same direction as the boundary layer flow, thereby the boundary layer flow makes a smooth flow as it is and its development and growth at that portion is suppressed.

Accordingly, a loss caused by the secondary flow is prevented, a response to a high load becomes possible and the entire apparatus can be made compact in size.

It is to be noted that the present invention, being described with respect to the preferred embodiment with reference to the figures in the above, is not limited to said preferred embodiment but may be added naturally with various modifications in the concrete structure within the scope of the appended claim.

What is claimed is:

1. An axial compressor stationary blade comprising:

a blade body having opposite ends, a leading edge, a trailing edge, opposite sides, a longitudinal direction extending between the opposite ends, and a cross section between said opposite sides, said leading edge and said trailing edge that is substantially perpendicular to the longitudinal direction;

wherein said blade body has a direction that is substantially perpendicular to the longitudinal direction at the cross section thereof and that extends from said leading edge to said trailing edge;

wherein said blade body comprises a first blade portion at one of the opposite ends adjacent to an end wall face, the direction of said blade body at the cross section at said first blade portion coinciding with a direction of boundary layer flow occurring at the end wall face;

wherein said blade body comprises a second blade portion for a main flow, the direction of said blade body at the cross section at said second blade portion being different than the direction of said blade body at the cross section at said first blade portion over a twist angle such that the cross section at said second blade portion appears turned as a whole with respect to the cross section at said first blade portion as seen in the longitudinal direction; and wherein the direction of said blade body at said cross section at the other of the opposite ends of said blade body coincides with the direction of said blade body at said cross section at said first blade portion.

2. The axial compressor stationary blade of claim 1, wherein the twist angle is greatest at a point that is closer to one of the opposite ends than to the other of the opposite ends.

3. The axial compressor stationary blade of claim 1, wherein the twist angle varies at different points in the longitudinal direction along said second blade portion.

4. An axial stationary compressor blade comprising a blade portion near an end wall face that is directed so as to coincide in direction with boundary layer flow that will occur in the vicinity of the blade portion near the end wall face, and comprising a blade portion for main flow directed differently than that of the blade portion near the end wall face such that the cross section of the blade portion for main flow appears turned as a whole over a twist angle with respect to that of the blade portion near the end wall face, and wherein a blade portion near an end opposite to the blade portion near the end wall face is directed so as to coincide with the direction of the blade portion near the end wall face.

5. The axial compressor stationary blade of claim 4, wherein the twist angle is greatest at a point that is closer to one opposite end of said blade than to another of opposite end.

6. The axial compressor stationary blade of claim 4, wherein the twist angle varies at different points in the longitudinal direction along said blade between opposite ends thereof.

7. An axial stationary compressor blade comprising a blade portion near an end wall face that is directed so as to coincide in direction with boundary layer flow that will occur in the vicinity of the blade portion near the end wall face, and comprising a blade portion for main flow directed differently than that of the blade portion near the end wall face such that both leading and trailing edges of the blade portion for main flow appear turned over a twist angle with respect to leading and trailing edges of the blade portion near the end wall face as seen in a longitudinal direction of the blade, and wherein a blade portion near an end opposite to the blade portion near the end wall face is directed so as to coincide with the direction of the blade portion near the end wall face.

8. The axial compressor stationary blade of claim 7, wherein the twist angle is greatest at a point that is closer to one opposite end of said blade than to another of opposite end.

9. The axial compressor stationary blade of claim 7, wherein the twist angle varies at different points in the longitudinal direction along said blade between opposite ends thereof.

* * * * *